June 16, 1964  G. COHEN DE LARA ETAL  3,137,651
PROCESS FOR THE TREATMENT OF SOLIDS BY LIQUIDS
Filed April 25, 1960
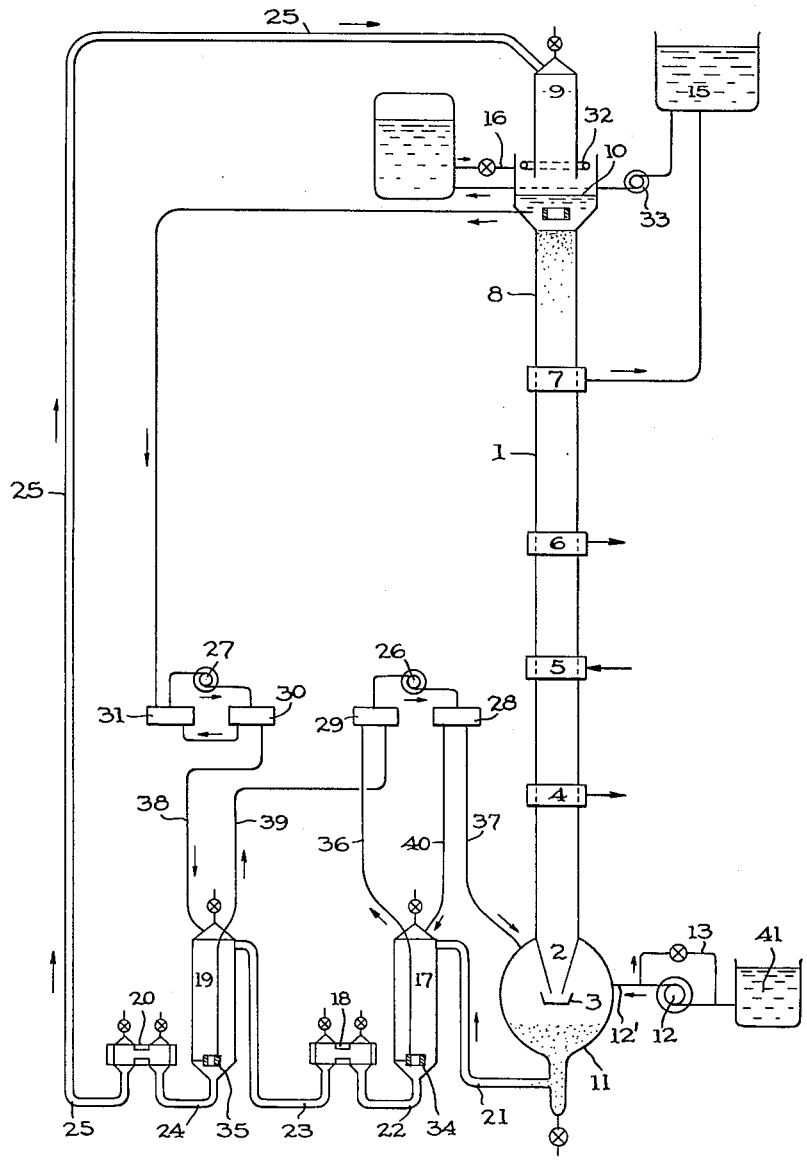

United States Patent Office 3,137,651
Patented June 16, 1964

3,137,651
PROCESS FOR THE TREATMENT OF
SOLIDS BY LIQUIDS
Georges Cohen de Lara and Michel Delachanal, Grenoble,
Roger Platzer, Chatillon-sous-Bagneux, and Jacques
Hure, Fontenay-aux-Roses, France, assignors to Commissariat à l'Energie Atomique, Paris, France
Filed Apr. 25, 1960, Ser. No. 24,524
Claims priority, application France Apr. 30, 1959
6 Claims. (Cl. 210—33)

The present invention relates to a process for the treatment of solids in the granular state by liquids, as well as to an apparatus for carrying out this process.

In known processes which use columns filled with solid, in which the liquid is introduced at a certain level from the bottom of the column, in order to leave at the top of it, there is generally the difficulty of not being able to pass the liquid with a sufficiently high speed; in fact, the upper limit of the output of the liquid is generally too low, because it must be lower than that at which it causes entrainment of the solid granules by the liquid.

In order to remedy this disadvantage, a method has been proposed which consists in maintaining at the top of the column, above the zone of counter-current treatment, a supplementary portion for a solid mobile bed. However, these known processes still have disadvantages, particularly as regards the extraction and recycling of the solid granules; these necessitate in fact the use of pumps for conveying a suspension of solid in the liquid, although the disadvantages of this are known; it is known particularly that on passing through pumps and valves some solids crumble, and that also the pumps wear extremely rapidly, without taking account of blockages which tend to be produced in such apparatus. This is the case particularly with the processes and apparatus described in U.S. specifications Nos. 2,813,781 and 2,815,322.

The second specification mentioned relates to the use of a fixed bed, which is periodically recycled to the bottom of the column; the liquid is passed through periodically and not simultaneously with the recycling of the solid; under these circumstances, the effective duration of contact of the liquid with the solid is relatively low, which can considerably reduce the hourly yield of the apparatus.

The present invention has the object of avoiding the disadvantages mentioned, which are still present in the known processes; it allows the circulation of the liquid to be effected with high speeds and to obtain high yields, both with respect to time and to the volume of the apparatus.

Also, the process according to the invention introduces into technology the considerable advantage of avoiding the use of pumps for transporting solid suspensions, which pumps are used solely for the circulation of the liquid.

Another object of the invention is an improved apparatus, permitting the treatment of solids by liquids, extraction of the solids and their reintroduction into the operative cycle, in a very practical manner and with a considerable reliability.

The process according to the invention consists in continuously passing a liquid through a fixed bed of solid in the granular state and then a portion of the granular solid is periodically removed, in suspension in the liquid, from one of the extremities of the bed; an equivalent portion of granular solid, also in suspension in the liquid, is periodically reintroduced at the opposite end of the bed.

The periodic advance of the solid, for reasons of extraction, can be effected while the liquid circulates in the same sense or in the inverse sense to this advance.

A particular embodiment consists in slowing the movement of the liquid during the periods of advance of the solid, when this advance is effected in the sense opposite to that of movement of the liquid; this lowering of the speed of the liquid permits the advance of the solid.

According to a variant of the process, the sense of passage of the liquid is reversed, during the periods of advance of the solid, in such a manner that during these periods the liquid is displaced in the same sense as the granules of solid and thus facilitates the advance of the desired portion of the latter. This characteristic has the advantage to increase, in an important way, the contact time between solid and liquid substances thus activating reactions of material and energy transfer, especially at low reaction speed.

Thus in the process of the invention, the liquid always circulates, both during the periods of advance of the solid and at other times from these periods; it can, however, always circulate in the same sense, with a lower speed during the periods of advance or also first in one sense and then in the other.

The portion of granular solid periodically withdrawn from the bed with a view to treatment, such as by regeneration, is subsequently reintroduced into the other extremity of the bed and this reintroduction is likewise periodic and may or may not coincide with the removal. According to the preferred form of the invention, the extraction and reintroduction are carried out simultaneously during the same period, but the portion reintroduced is that which has been extracted in the course of one of the preceding periods. In this manner, between the discharge of the bed and its reintroduction the given portion has time to be submitted to suitable treatments.

One of the treatments of the granular solid is for example a regeneration by known means, as arises with an ion exchanger.

Another treatment, which is independent of or combined with the above consists in the replacement of the initial liquid in the suspension by another liquid. In fact, according to a preferred mode of operation, the portion of the granular solid withdrawn from the bed, during the period of extraction, is constituted by a suspension of granules in the liquid which has not previously passed through the bed; in this case, before reintroduction of the solid granules into the bed, their liquid is separated at least partly, to be replaced by a corresponding quantity of liquid taken from the outlet of the bed, that is to say, the liquid which has already reacted with the solid.

The process according to the invention can be carried out in a known column provided with the usual inlets and outlets for the liquid and the solid; however this column is provided at its upper part, above the outlet for the treated liquid, with means for preventing rising of the solid granules, that is to say, for preventing expansion of the bed. On the other hand, the column is provided with novel devices, comprising one or more reservoirs for the liquid, situated above the column, and at least two storage chambers connected together in series, placed at the bottom of the column; the first of the chambers is connected to the base of the column and the latter is in communication at the same time with the top of the column and the reservoirs for the liquid.

The means for preventing expansion of the solid bed, at the top of the column, can be constituted by a valve, but are preferably formed by a supplementary funnel part of the column itself, intended to contain a certain height of the solid bed above the outlet of the liquid from the column. According to a variation, these means are constituted by a system arranged to create, in the upper funnel part of the column, an auxiliary circulation of the fluid directed from top to bottom; this system comprises for example a conduit leading from the outlet for the treated liquid and discharging at the upper extremity of the funnel; a pump branched off from this source then causes circulation of a portion of the liquid from top to bottom of the upper funnel of the column; also this circulation is regulated so that the force exerted on the bed of solid opposes its displacement toward the top of the assembly of the solid bed.

Preferably, the bottom of the column, instead of being in direct communication with the first storage chamber, plunges into an intermediate sealed bath.

According to a preferred embodiment the column terminates at the bottom in a truncated conical part situated inside the intermediate bath; the end of this truncated part extends inside a retractable cupel which provides fixation of the solid bed in the column during arrest of the operation of the apparatus; in particular, it serves to prevent discharge of the solid granules in the column during replenishment of it, before it is put into operation.

Preferably, the storage chambers are provided inside with means for separation of the liquid from the solid granules. Channels, comprising pumps and valves, connecting the storage chambers to the column and to the reservoirs for the treated liquid, are disposed in such a manner that they serve solely for the liquid; conveyance of the solid in suspension between the bottom of the column the storage chambers and the top of the column is effected by suction or by back pressure of the pumps in which the liquid passes alone.

The disposition of the different parts constituting the apparatus according to the invention will be better understood from the non-limitive example described below.

In the accompanying drawing, a column 1 is shown for containing a bed of granular solid; its truncated conical inner part 2 is located at the interior of a sealed bath 11. The truncated part terminates into a retractable cupel 3; by means of a mechanism (not shown in the drawing), the cupel 3 can be put into the position where it is shown in the figure or can be displaced to the end 2 of the column for completely engaging the outlet of this truncated part. During replenishment of the column and during standstill of the apparatus, the cupel 3 prevents the solid from completely filling the bath 11; in fact, a small quantity of granules in the cupel form a screen which obstructs the lower aperture of the truncated part 2, preventing the granules from continuing to discharge. This does not prevent the liquid from passing the screen of granules in the cupel for passing into the column. On the other other, during the periods of descent (advance) of the solid bed, with a view to its ultimate extraction, the cupel 3 is retracted in order to allow the solid to pass; this retraction is not necessary if the sense of discharge of the liquid is reversed during such periods. However, the dimensions of the bath 11 are sufficient for the cupel not to be blocked by the solid granules with which the bath is provided in its lower part. The cupel 3 is never in contact with the lower end 2 and the operations of locating and retracting the cupel cannot adversely effect the solid granules.

At 4, 5, 6 and 7 are shown diagrammatically annular parts provided inwardly with a filter material, communicating on the one hand with the interior of the column and, on the other hand, with the exterior channels for the inlet and outlet of the liquid; the number and disposition of these parts 4, 5, 6 and 7 varies according to the nature of the operation to be effected in the column.

Above the outlet for the liquid 7, the column is extended by a funnel 8 also intended to be filled with granular solid; the bed filling the funnel 8 prevents expansion of the bed in the column 1, during high outputs of liquid passing from the bottom of the column towards the outlet 7.

The part 8 of the column is surmounted by a first sealed receptacle 10, for always containing the liquid indirectly providing a reservoir 15 open to the atmosphere, this contains the liquid discharged from 7, namely, which has traversed the bed of solid in the column 1.

By the receptacle 10 is placed another sealed reservoir 14 connected with 15 by a channel in which is mounted the pump 33; this pump permits the introduction into the reservoir 14 of the desired quantity of liquid. The gaseous phase above the liquid in the reservoir 14 can be suitably compressed (by operation of the pump 13 or by an exterior pneumatic means (not shown)), so that the liquid at 14 is under the necessary pressure for extraction at the bottom of the column 1 of a predetermined portion of the bed of granular solid. It is necessary in fact for the pressure of the liquid at 10 to permit, during the period of extraction, the descent of the bed contained in the column 1. Communication between the reservoirs 14 and 10 is established by a channel comprising the valve 16 and terminating in 10 in a liquid distribution weir.

The receptacle 10 is surmounted by a part 9 at which emerges the channel 25 by which is recycled, in the column, the suspension of granules of solid.

The bath 11 at the bottom of the column 1 is connected through the intermediary of the pump 12 to a receptacle 41 containing the liquid to be treated; regulation of the input of this liquid into 11 is effected by means of a by-pass valve 13.

The lower part of the sealed bath 11 is in communication by 21 with the top of the storage chamber 17, the lower part of which communicates with the top of the second storage chamber 19 through the intermediary channels 22 and 23 between which is interposed a valve 18. On the other hand, the upper part of the both 11 communicates through the intermediary of the valve 28 with a pump 26. This pump 26 and valve 28 are connected at 40 to the top of the chamber 17. On the other hand, a conduit 36 plunging to the bottom of the chamber 17 and provided with a filter 34 is in communication with the pump 26 through the interposition of the valve 29. In a similar manner, the pump 27 and the valves 30 and 31 supply the chamber 19; this is in communication at its upper part with the receptacle 10 and at its lower part with the conduit 25, from which it can be isolated by means of the valve 20.

During operation of the apparatus, the pump 12 continually supplies the liquid to be treated into the bath 11; the liquid rises in the column 1, passes through the bed of solid and leaves at 7 to be stored in 15, the valve 16 then being closed.

Periodically, the valve 16 is opened in order to allow a certain quantity of liquid to enter at 10, under the prevailing pressure by way of the distribution weir 32; this has the effect of lowering the bed of granular solid; a portion of the granules then falls to the bottom of the bath 11. The speed of descent of the solid bed can be regulated by control of the pressure in the reservoir 14; as this pressure is lower than, equal to or higher than that which prevails in the bath 11, the output of liquid in the column is respectively diminished, stopped or reversed.

The operation of the apparatus is rendered continuous by the extraction of the granules contained in the bath 11 and their transport into the chamber 17 through the conduit 21. In the apparatus shown in the drawing, extraction can take place simultaneously with re-introduction of an equivalent portion of granules through the channel 25 in the part 9, at the top of the column. These periodic operations are effected in two stages, while the column continues to operate with the liquid entering at 12 and leaving at 7.

The first stage of the extraction/re-introduction period comprises the passage of the suspension of solid at 11 into 17 through 21 and, simultaneously, the passage of the suspension at 19 into 9 through 24 and 25. During this stage, the pump 26 withdraws only liquid through the channel 36 from the filter 34 which terminates this channel at the bottom of the chamber 17; the liquid thus withdrawn is conveyed through the channel 37 into the sealed bath 11; thus a large part of the initial liquid, in which the granules of solid are in suspension in 11, returns to the bottom of the column 1. At the same time, the pump 27 withdraws the liquid from the receptacle 10 by passing through the valve 31, and forces it through 38 to the chamber 19; in this chamber, the liquid already treated (entering at 10) recontacts the solid granules which were located there in the preceding period; it entrains them in the form of a suspension through the channels 24 and 25, the valve 20 being opened. During the course of this first stage, the valve 18 is closed.

At the end of the first stage described above, it is sufficient to prolong slightly the operation of the pump 27 so that the liquid entrains the last fractions of granular solids through the valve 20 and the channels 24 and 25. In this manner, there is no risk of deposition of the solid nor of blockages during the following stage, in the course of which 20, 24 and 25 do not operate.

The second stage of the operation consists in the transfer of the granules of solid from the bottom of the chamber 17 to the top of the chamber 17 through 22-23, the valve 18 being opened and the valve 20 being closed. This is effected by withdrawing only liquid, through the channel 39 provided with the filter 35, by means of the pump 26 and simultaneously forcing this liquid to the interior of the chamber 17 through the conduit 40.

At the end of the second operative stage, it is suitable to operate the pump 26 for a further time in order to rinse the valve 18 and the conduits 22 and 23 which have contained the suspension of the solid granules; by so doing, the granules are entrained by the liquid alone coming from 19 through the tubes 39 and 40, so that the chamber 17 does not receive solid during this operation.

Preferably, the successive openings and closing of the valves 16, 18, 20, 28, 29, 30 and 31, as well as the pumps 26, 27, are controlled by one or more programming clock mechanisms, not shown in the drawing; they are established so that in no case are the valves 18 and 20 both open simultaneously and so that the continued rotation of the pumps does not cause excess pressure to act on the closed valves. It may be remarked, in accordance with the above, that the pumps 26 and 27 solely convey liquid, while the suspension of solid granules in the liquid are conveyed from 11 to 17, from 17 to 19 and from 19 to 9 solely by circulation under pressure or sub-pressure periodically created in the chambers 17 and 19 by means of the pumps through the intermediary of the liquid.

It may be mentioned that, owing to the arrangements described, the operations of extraction and re-introduction of the solid granules cannot disturb or prevent circulation of the liquid in the column 1. It is noted, in fact, that the system of extraction and re-introduction, which comprises the circuit from 21 to 9 via 25, is always distinct from the treating circuit formed by the pump 12, the bath 11, the column 1 and the reservoir 15. Also, these two circuits can be controlled by two independent clock mechanisms.

The apparatus described comprises only two storage chambers 17 and 19, but it is to be understood that a greater number of such chambers can be used. This can be the case, for example, when complete replacement of the initial liquid of the suspension by the treated liquid comes into question; also, one or more of these chambers can be utilised for regeneration of the granules of solid, for example, by treatment with a base or an acid where an ion exchanger is concerned.

We claim:
1. In a method of treating a granular solid with a liquid wherein the liquid is fed from an outside source to a column containing a bed of the granular solid, the column constituting a portion of a circular through which a suspension of the solid in the liquid is transferred from the bottom region of the column to the top region of the column, the improvement comprising the steps of continuously passing the liquid through the bed of granular solid, periodically moving the bed toward the bottom region of the column, periodically removing a fraction of the bed from the bottom region of the column into a sealed bath, introducing into the top region of the column an amount of granular solid substantially equalling the removed fraction of the bed and maintaining a body of the granular solid on top of said bed to prevent expansion of said bed by the liquid passing therethrough.

2. In a method as described in claim 1, the further steps of separating at least a substantial volume of the liquid from the fraction of the bed after removing the fraction from the column, substituting for the separated liquid a volume of the liquid which has already passed through the bed, and then introducing the last named liquid and fraction of the bed into the top region of the 3. In a method as described in claim 1, the additional step of introducing the granular solid into the top region of the column simultaneously with the removal of the fraction of the bed from the bottom region of the column.

4. In a method as described in claim 1, the liquid moving countercurrently with respect to the movement of the bed.

5. In a method as described in claim 4, the additional step of reducing the velocity of movement of the liquid during movement of the bed.

6. In a method as described in claim 4, the additional step of reversing the direction of flow of the liquid during movement of the bed.

References Cited in the file of this patent
UNITED STATES PATENTS

| | | |
|---|---|---|
| 1,471,751 | Rankin | Oct. 23, 1923 |
| 1,745,421 | Higgins | Feb. 4, 1930 |
| 2,042,818 | Allen et al. | June 2, 1936 |
| 2,762,683 | Massey | Sept. 11, 1956 |
| 2,815,322 | Higgins | Dec. 3, 1957 |
| 2,833,630 | Loevenstein | May 6, 1958 |
| 2,973,319 | Porter | Feb. 28, 1961 |
| 3,003,641 | Laughlin | Oct. 10, 1961 |

UNITED STATES PATENT OFFICE
CERTIFICATE OF CORRECTION

Patent No. 3,137,651                                          June 16, 1964

Georges Cohen de Lara et al.

It is hereby certified that error appears in the above numbered patent requiring correction and that the said Letters Patent should read as corrected below.

Column 3, line 47, for "other", second occurrence, read -- hand --; column 4, line 32, for "both" read -- bath --; column 6, line 14, for "circular" read -- circuit --; line 33, after "the", third occurrence, insert -- column. --.

Signed and sealed this 13th day of October 1964.

(SEAL)
Attest:

ERNEST W. SWIDER
Attesting Officer

EDWARD J. BRENNER
Commissioner of Patents